United States Patent [19]

Labrecque

[11] Patent Number: 4,901,664

[45] Date of Patent: Feb. 20, 1990

[54] SURVIVAL KIT APPARATUS

[76] Inventor: Sylva Labrecque, RD #2 Box 170-48, Richmond, Vt. 05477

[21] Appl. No.: 295,138

[22] Filed: Jan. 9, 1989

[51] Int. Cl.$^4$ .............................................. B64B 1/40
[52] U.S. Cl. .............................. 116/210; 116/DIG. 8; 116/DIG. 9; 206/573; 446/220
[58] Field of Search .................. 116/DIG. 8, DIG. 9, 116/210, 209; 40/212, 214, 215; 446/220, 224, 225; 206/573, 803

[56] References Cited

U.S. PATENT DOCUMENTS

| 2,346,695 | 4/1944 | Miller | 362/390 |
|---|---|---|---|
| 3,174,455 | 3/1965 | Peterson | 116/210 |
| 3,254,756 | 6/1966 | Rankin | 206/573 |
| 3,414,365 | 12/1968 | Cranston | 206/803 |
| 3,796,181 | 3/1974 | Collins | 116/210 |
| 3,881,531 | 5/1973 | Rossi | 141/313 |
| 3,938,466 | 2/1976 | Crissman | 116/210 |
| 3,964,427 | 6/1976 | Murphy | 116/DIG. 9 |
| 4,292,999 | 10/1981 | Szollmann | 116/DIG. 9 |
| 4,416,433 | 11/1983 | Belling | 116/210 |
| 4,577,262 | 3/1986 | Buteaux | 206/803 |
| 4,586,456 | 5/1986 | Forward | 116/210 |
| 4,697,706 | 10/1987 | Schaller | 116/210 |
| 4,753,377 | 6/1988 | Puluhowich | 206/803 |

FOREIGN PATENT DOCUMENTS

| 658710 | 3/1963 | Canada | 116/210 |
|---|---|---|---|
| 525715 | 5/1931 | Fed. Rep. of Germany | 116/210 |
| 1506782 | 5/1967 | Fed. Rep. of Germany | 116/DIG. 9 |
| 2594244 | 8/1987 | France | 116/210 |
| 7900954 | 11/1979 | PCT Int'l Appl. | 206/573 |

Primary Examiner—William A. Cuchlinski, Jr.
Assistant Examiner—Jeffrey J. Hohenshell
Attorney, Agent, or Firm—Leon Gilden

[57] ABSTRACT

A survival kit apparatus is set forth wherein the same provides for a container formed with a pivotally mounted lid securable about a forward face of the container. The kit includes a selectively illuminated compass formed within the lid and a secondary storage container formed through the lid containing food rations and cutlery therein. The interior of the container includes a spool of flexible tether line formed with axially extending axles from the spool. A valved pressurized helium container has secured thereto an inflatable signal balloon and a flashlight removably positioned within a padded tubular support holder removably secured within the container along a forwardmost wall thereof. A first end of the support hose is provided with diametrically opposed finger access slots at one end of the support holder for removal of the flashlight from within the support holder, and the second end of the support holder includes a second diametrically opposed pair of finger access openings further including latch members pivotally mounted overlying the finger access slots. Removal of the helium container from within the tubular support holder enables positionment of the spool of tether line within the support holder and secures the spool within the second end of the support holder by securing the extending axles of the spool by said pivoted latch members.

8 Claims, 4 Drawing Sheets

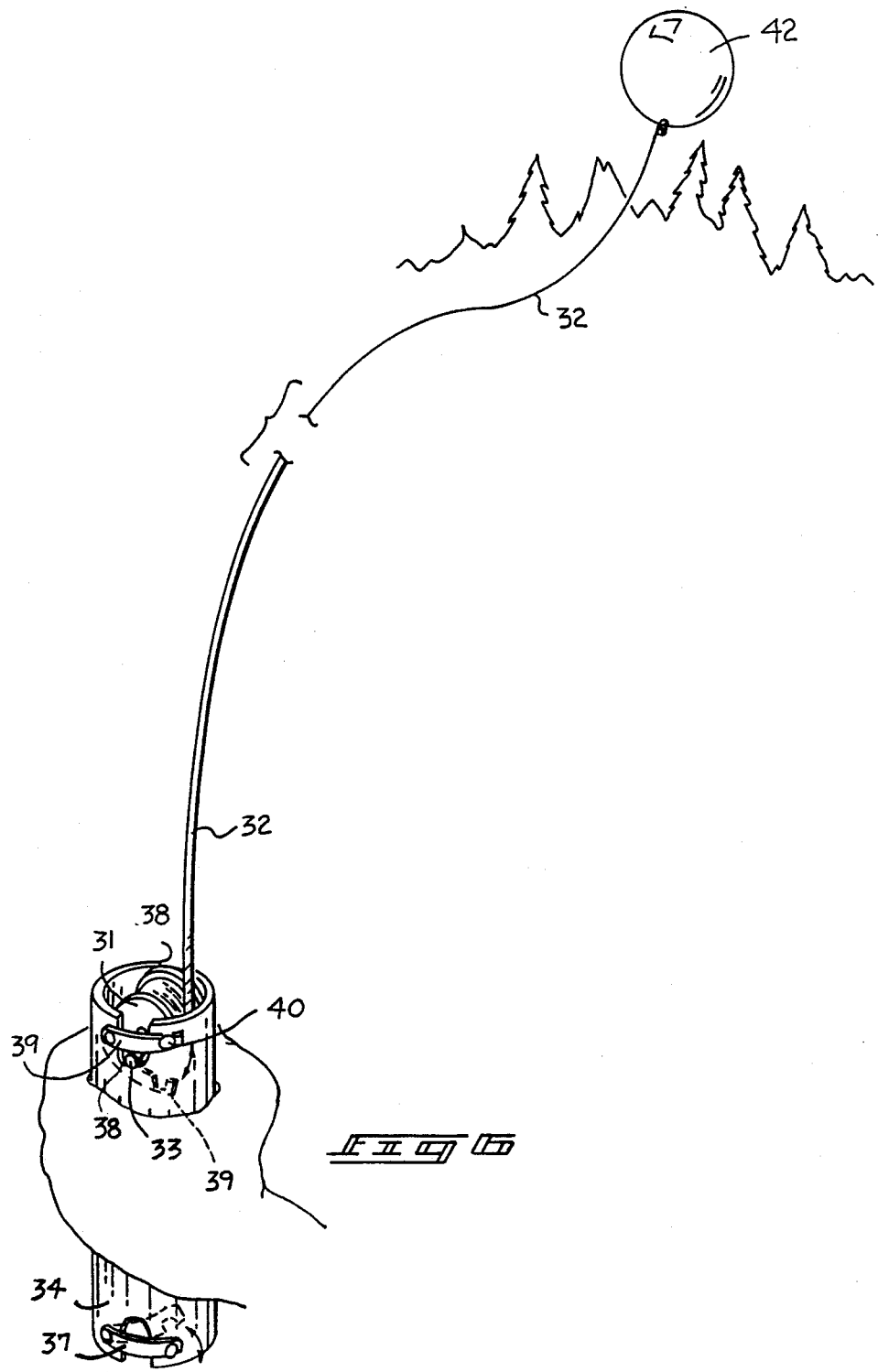

SURVIVAL KIT APPARATUS

BACKGROUND OF THE INVENTION

1. Field of the Invention

The field of invention relates to survival apparatus, and more particularly pertains to a new and improved survival kit apparatus wherein the same may be compactly stored during periods of non-use and may be effectively opened to provide access to survival components therewithin.

2. Description of the Prior Art

The use of survival apparatus is well known in the prior art. Prior devices have frequently been of expansive and awkward construction to limit their adaptability as necessary portable units. Furthermore, these devices when of appropriate size have failed to provide adequate components in life saving situations. For example, U.S. Pat. No. 3,174,455 to Peterson sets forth an inflatable signal balloon illustrating the use of a valve inflation container, but has failed to provide the tether line holding means wherein the inflation balloon of the Peterson device utilizes an unsupported reel, as opposed to the instant invention providing securement of the reel structure in an easily graspable and manipulatable securement holder.

U.S. Pat. No. 3,796,181 to Collins sets forth an inflation container in combination with a signal balloon of an organization securable within a belt arrangement, but as in other prior art devices fails to provide the necessary survival kit components as set forth by the instant invention.

U.S. Pat. No. 3,881,531 to Rossi sets forth an inflatable signal device utilizing an adapter to fill an associated balloon with a further adapter to enable flow of gas from a supply tank. The instant invention is of interest relative to the inflation of a balloon, but falls short in the details of providing appropriate survival components as set forth by the instant invention.

U.S. Pat. No. 3,938,466 to Crissman sets forth a location indicating device provided with an inflatable balloon and a self-contained spool of tether line and is of interest relative to the use of tether lines secured, not to the container, but to a grasping device axially extending from the container to enable the balloon to be secured to a ground anchor.

U.S. Pat. No. 4,586,456 to Forward sets forth a balloon distress marker wherein the balloon includes unique organization in the inflation of the balloon, but as in other prior art devices has failed to set forth the appropriate tether line mounting structure as well as the survival kit components as set forth by the instant invention.

As such, it may be appreciated that there continues to be a need for a new and improved survival kit apparatus which addresses both the problems of compactness and effectiveness, and in this respect the present invention substantially fulfills this need.

SUMMARY OF THE INVENTION

In view of the foregoing disadvantages inherent in the known types of survival kit apparatus now present in the prior art, the present invention provides a survival kit apparatus wherein the same may be compactly stored when not in use and may be further easily and efficiently transported during periods of non-use until such use is required. As such, the general purpose of the present invention, which will be described subsequently in greater detail, is to provide a new and improved survival kit apparatus which has all the advantages of the prior art survival kit devices and none of the disadvantages.

To attain this, the present invention comprises a container including a pivotally mounted lid wherein the lid includes a selectively illuminated compass and a secondary container wherein the secondary container includes various survival components such as food, matches, and cutlery. The interior of the container includes a spool of tether line wherein the spool is formed with diametrically opposed and extending axles. An elongate tubular securement container of a length substantially equal to that of the interior length of the container is securable within the container and removable therefrom wherein the securement container includes a plurality of finger openings diametrically opposed to one another at one end of the container for removal of an included flashlight within the padded interior of the container at one end thereof and a further plurality of opposed finger recesses at a second end of the container. The further finger recesses are formed with pivotally mounted latch members securable over the recesses for securement of the axles of a tether line within the securement container upon removal of a helium container and an associated signal balloon therewithin.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved survival kit apparatus which has all the advantages of the prior art survival kit apparatus and none of the disadvantages.

It is another object of the present invention to provide a new and improved survival kit apparatus which may be easily and efficiently manufactured and marketed.

It is a further object of the present invention to provide a new and improved survival kit apparatus which is of a durable and reliable construction.

An even further object of the present invention is to provide a new and improved survival kit apparatus which is susceptible of a low cost of manufacture with regard to both materials and labor, and which accordingly is then susceptible of low prices of sale to the consuming public, thereby making such survival kit apparatus economically available to the buying public.

Still yet another object of the present invention is to provide a new and improved survival kit apparatus which provides in the apparatuses and methods of the prior art some of the advantages thereof, while simultaneously overcoming some of the disadvantages normally associated therewith.

Still another object of the present invention is to provide a new and improved survival kit apparatus wherein the same includes survival components in a compact organization.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an isometric illustration of the tubular securement container and the reel of tether line secured therein and attached to the associated signal balloon.

DESCRIPTION OF THE PREFERRED EMBODIMENT

Figure 1:
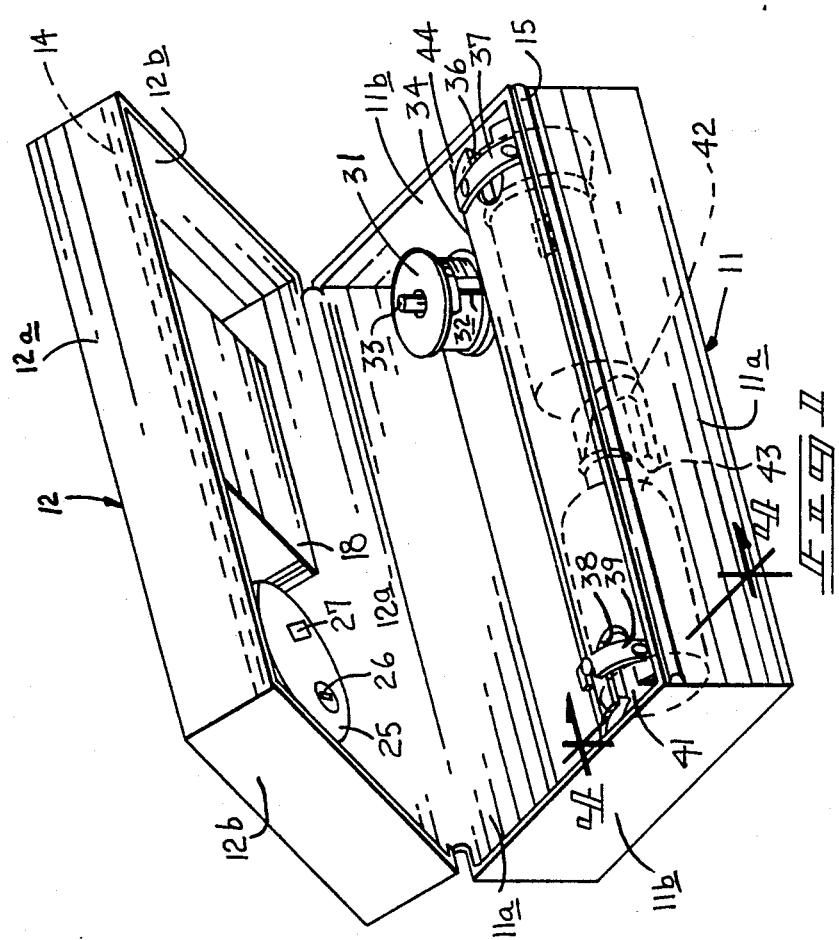
FIG. 1 is an isometric illustration of the survival kit illustrating the various components therewithin.
Figure 2:
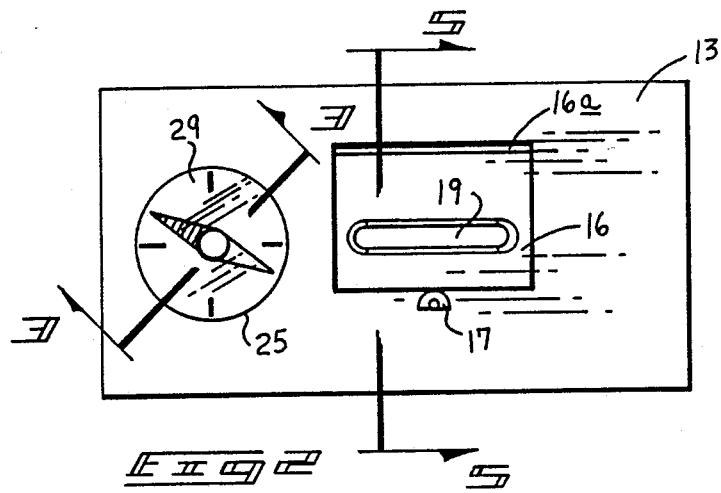
FIG. 2 is a top orthographic view of the survival kit of the instant invention.
Figure 3:
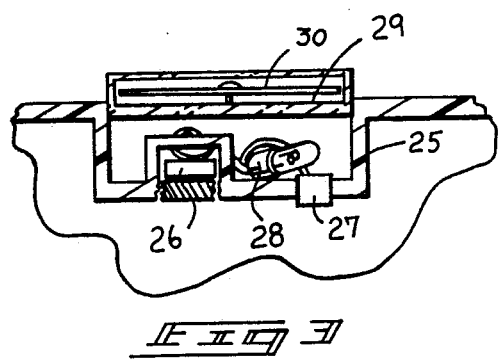
FIG. 3 is an orthographic view taken along the lines. 3—3 of FIG. 2 in the direction indicated by the arrows.
Figure 4:
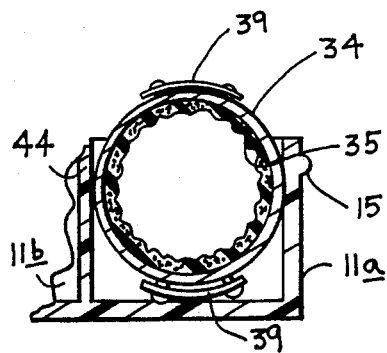
FIG. 4 is an orthographic view taken along the lines 4—4 of FIG. 1 in the direction indicated by the arrows.
Figure 5:
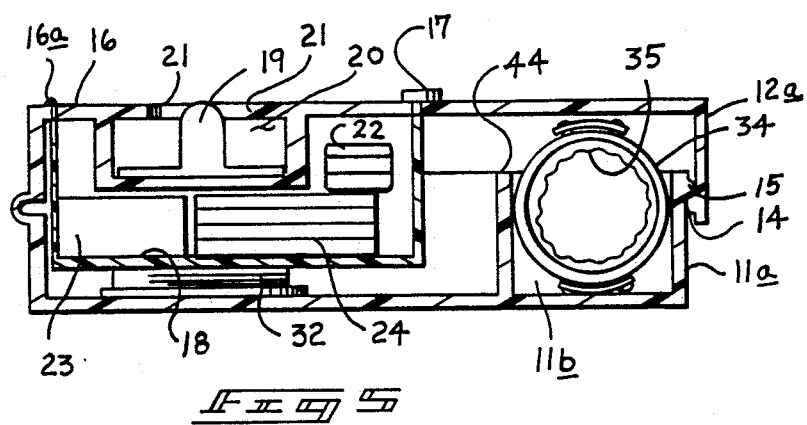
FIG. 5 is an orthographic view taken along the lines 5—5 of FIG. 2 in the direction indicated by the arrows.

With reference now to the drawings, and in particular to FIGS. 1 to 6 thereof, a new and improved survival kit apparatus embodying the principles and concepts of the present will be described.

More specifically, the survival kit apparatus 10 essentially comprises a container including a lower container portion 11 formed with elongate parallel side walls 11a, parallel end walls 11b formed orthogonally about an included floor. Pivotally mounted along a side wall of the lower container portion 11 is a lid 12 formed with parallel side walls 12a, parallel end walls 12b, and an orthogonally oriented integrally formed top 13. A forward side wall 12a includes an elongate recess 14 cooperating with a coextensive arcuate lip 15 integrally formed to an adjacent cooperative side wall 11a wherein the lid 12 thereby is secured to the lower container portion 11.

A second lid 16 is pivotally mounted onto the top 13 of the lid 12 along a hinged member 16a with a pivotally mounted closure tab 17 pivotally mounted onto the top 13 and selectively overlying the second lid 16 to secure the second lid 16 in a closed orientation. The second lid 16 overlies a second container compartment 18 formed with a retractable "T" shaped handle retractable within a handle cavity 20 formed in the second lid 16 to avoid obstruction of an outwardly extending handle and provide an unobstructed top surface of the survival kit apparatus 10. Overlying lid flanges 21 extend overlying the handle cavity 20 to prevent complete removal of the handle 19 from the cavity 20. The second container compartment 18 includes utensils 22 such as cutlery, food packages 23, and matches 24, necessary components of a survival kit.

A compass 25 is formed within a housing recessed within the top 13 and includes a battery compartment 26 with an associated switch 27 to selectively illuminate a bulb 28 that will illuminate through the transparent compass plate 29 to enable visual observation of the compass 25 in a low light environment. The opaque indicator needle 30 is thereby visually observable during various lighting situations.

Positioned adjacent the interiorly projecting second compartment 18 is a spool 31 including an extensive length of flexible tether line 32. The spool 31 is formed with protruding and axially aligned axles 33 that project exteriorly of the spool 31, as illustrated in FIG. 1 for example.

The rear walls 11a of the kit apparatus 10 accepts the adjacent compass 25, the second compartment 18, and the diameter of the spool 31 are a length to substantially equal the interior length of the lower container portion 11.

Aligned adjacent forward walls of the lid and container is a padded tubular support container 34, itself of a length substantially equal to the interior of lower container portion 11. The support container 34 is formed with an interior surface padding 35 about its interior surface to contain a flashlight 37 and a compressed helium container 41. A first forward end of the support container 34 includes diametrically opposed first finger recesses 36 to enable manual grasping of the flashlight 37 upon removal of the support container 34 from the lower container 11. At the second distal end of the support container 34 are a pair of second finger recesses 38, also diametrically opposed relative to one another, to provide access and removal of the compressed helium container 41. The second finger recesses 38 each include a pivoted latch 39 to overlie a lower end of each respective finger recess 38 and spaced above the respective lower ends of recesses 38 a distance substantially equal to the diameter of the axles 33.

Each pivotal latch 39 is pivoted at one end on one side of a respective finger recess 38 and securable at the other end by means of a clasp 40. Reference to FIG. 6 illustrates the positioning of the spool 31 interiorly of the support container 34 upon removal of the helium container 41 therefrom. In this manner subsequent to a filling of the signal balloon 42 associated with the compressed helium container 41, a leading end of the flexible tether line 32 is secured about the balloon 42 wherein securement of the spool 31 within the support container 34 provides an enlarged manual grasping surface to enable enhanced grasping and manipulation of the signal balloon 42. In this manner, the support container 34 may thereby be secured or manipulated at ground level for enhanced control of the balloon 42.

The compressed helium container 41 is provided with an associated valve 43 to enable selective filling of the balloon 42. In this manner should the balloon 42 suffer a loss of helium, the balloon may be refilled as is necessary from the container 41.

The support container 34 is maintained in position within the lower container portion 11 by positionment between a respective forward side wall 11a and elongate projecting strips 44 integrally formed to the opposed end walls 11b and spaced from the adjacent forward side wall 11a a distance substantially equal to the diameter of the tubular support container 34.

The manner of usage and operation therefore of the instant invention should be apparent from the above description. The instant invention provides a compact survival kit apparatus wherein the components are readily available and compactly stored within various components of the container 11 and lid 12 to provide access and security of the various components.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A survival kit apparatus comprising,
   a lower container portion including a rear and forward elongate container side walls, and opposed container end walls, and
   an integral floor secured to said side and end walls, and
   a lid including rear and forward lid side walls, and opposed lid end walls, and
   an integral top wall secured to said side and walls, and
   wherein said lid is pivotally secured to said container rear side wall by said lid side wall, and
   securement means formed on said container forward side wall and said lid forward side wall for selective securement of said lid to said container, and
   said lid further including a compass positioned within a housing directed interiorly of said lid adjacent said rear lid side wall, and
   a second container compartment directed interiorly of said lid formed adjacent said compass wherein said second container compartment includes a second lid including a hinge parallel to said lid in container side walls, and
   said container portion including a spool means for securement of a predetermined length of flexible tether line positioned adjacent said rear container side wall, and
   a tubular container selectively securable adjacent the forward container side wall coextensive with said forward container side wall including an illumination member and an inflation member selectively positioned interiorly of said tubular container wherein said inflation member includes a signal balloon operably secured to said inflation member for selective inflation of said signal balloon wherein said flexible tether line is selectively securable to said balloon subsequent to inflation of said balloon by said inflation member.

2. A survival kit apparatus as set forth in claim 1 wherein said tubular container includes an interior shock absorbing padding formed interiorly of said tubular container for absorbing shock to said illumination member and said inflation member.

3. A survival kit apparatus as set forth in claim 2 wherein said tubular container includes a plurality of diametrically opposed first finger recesses at a first end of said tubular container for providing manual access to said illumination member, and a plurality of second finger recesses formed at a second end of said tubular container for providing access to said inflation member.

4. A survival kit apparatus as set forth in claim 3 wherein said second finger recesses each include a pivoted latch said finger recess.

5. A survival kit apparatus as set forth in claim 4 wherein said compass includes an illumination means for illumination of said compass, and a switch for selective illumination of said illumination means, and said compass further includes a transparent compass indicator plate positioned between a compass needle and at a lowermost portion of said compass compartment to selectively direct illumination through said compass plate.

6. A survival kit apparatus as set forth in claim 5 wherein said second compartment includes cutlery, matches, and food components for survival of an individual.

7. A survival kit apparatus as set forth in claim 6 wherein said second lid includes an elongate handle recess therein, and a "T" shaped handle is securable in said handle recess captured therein by a plurality of flanges of said second lid extending and overlying said handle recess to prevent removal of said handle from said recess.

8. A survival kit apparatus as set forth in claim 7 including a closure tab pivotally mounted on said lid and selectively overlying said second lid for selective securement of said second lid to said lid.

* * * * *